Patented Jan. 8, 1952

2,581,412

UNITED STATES PATENT OFFICE 2,581,412

GEOPHYSICAL EXPLORATION

Gerhard Herzog, Houston, Tex., assignor to The Texas Company, New York, N. Y., a corporation of Delaware No Drawing. Application July 6, 1948,
Serial No. 37,301

16 Claims. (Cl. 250—83.6)

This invention relates to geophysical exploration or prospecting. It provides improved methods applicable in underground and surface surveys and is dependent upon the detection of natural neutrons emitted from the earth and the measurement of the intensity or spectrum of the neutrons detected.

There are a number of prior proposals for obtaining geophysical information through neutron detection, but in all instances the neutrons are produced artificially in the region of the earth formations investigated. In well logging, for example, a neutron source (say a mixture of radium and beryllium) is passed along the well bore and adjacent formations are bombarded with neutrons from the source. Some of these artificially produced neutrons are backscattered by the formations and it has been proposed to distinguish between formations penetrated by measuring the intensity of the neutrons scattered back into the bore in the vicinity of the source. Some of these neutrons result in the emission of gamma rays from the formations penetrated, and it has been proposed to identify the various formations by measuring the intensity of gamma rays emitted to the bore as the result of the action of the neutrons emitted from the source. By passing a source of gamma rays of sufficiently high energy along a well bore it is possible to produce neutrons in a formation by interaction thereof with gamma rays from the source, and the measurement of the intensity of neutrons thus produced and emitted into the bore has been proposed as a further method of formation identification.

Various earth formations, including strata of different geological ages as well as ore and petroleum deposits, contain characteristic amounts of radioactive contamination which emit gamma radiation. This fact has found application in gamma ray well logging, etc., in which variations in the intensity of natural gamma radiation from formations into a well bore are detected and employed for geological identification.

The radioactive substances which constitute the characteristic contamination in the earth formations emit alpha and beta radiation as well as gama rays. The alpha and beta rays have but slight penetrating power and in consequence detection of these rays adjacent earth surfaces in a well bore or elsewhere, gives but little information about the rock at any appreciable distance back of the surface. My invention overcomes this difficulty by making use of secondary radiation produced in the rock formations by certain nuclear reactions which occur in the formations and result in the production of natural neutrons. These have penetrating power much greater than the alpha and beta rays which produce them. The detection of these natural neutrons in geophysical exploration also gives information about the formations which is not obtained by other methods of radiation investigation, and which may serve to distinguish between formations when other methods fail to do so and may aid in the location of a variety of types of deposits which escape detection by other methods.

In its broad aspect, then, the invention contemplates the detection of naturally occurring neutrons emitted by earth formations, and distinguishing between formations on the basis of the differences in the natural neutron intensities or spectra determined for each. The invention also permits discovery and location of certain types of mineral deposits in which the opportunity for the production of natural neutrons by natural radioactive contamination is particularly favorable. Thus beryllium deposits may be detected through considerable depths of overburden by detecting natural neutrons of high penetration emitted by the deposit as the result of nuclear reaction of the beryllium with alpha particles from radioactive contaminations present in the deposit. This reaction is only one of a number of the $\alpha\text{-}n$ type which produce neutrons from a variety of elements.

Examples of the $\alpha\text{-}n$ type reaction are:

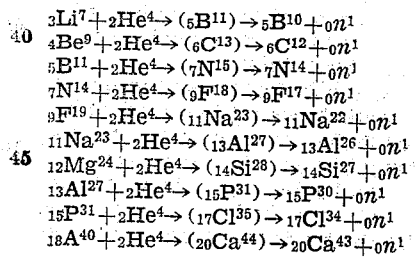

In many instances, the neutrons produced in reactions of the α-n type have energy spectra that are characteristic of the source element, say lithium, beryllium, sodium, argon, etc. In many cases the spectrum consists of several sharply distinguishable energy groups. For example, the neutrons derived from beryllium by α-n reaction have a sharp spectrum consisting of energy groups at 13.7, 12.0, 7.6, 6.2, and 4.6 m. e. v. and probably several additional groups in the range of 0.5 to 1.5 m. e. v. Because of its sharp character, such a spectrum can be distinguished with considerable certainty and aids in identifying the source element. My invention contemplates the measurement of energy spectra of the detected natural neutrons as an aid in source identification and for other purposes, described later. In many instances, this spectrum measurement need involve no more than distinguishing between the proportions of fast and slow natural neutrons.

The number (intensity) of neutrons and their character (energy) at the source depend not only upon the source element, i. e. beryllium, argon, boron, etc., but also upon the amount of radioactive contaminant which supplies the alpha or beta rays for the nuclear reactions. The intensity and the energy at the point of detection depend upon these factors and also upon the neutron absorption in travel from the source to the point of detection, i. e. upon the distance and the absorptive properties of the medium through which the neutrons have to pass. Hence determination of relative intensities or spectra or both, at a series of points along a traverse being investigated, may give information about any or all of these factors.

Neutron detection and intensity measurement in the practice of the invention can be done with a variety of apparatus. Neutrons possess no electric charge and produce no ionization directly in passage through a detector, say a conventional Geiger-Mueller counter which is sensitive to alpha, beta or gamma rays. However, neutrons enter into nuclear reactions which release ionizing particles, an example being

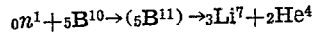

$$_0n^1 + {}_5B^{10} \rightarrow ({}_5B^{11}) \rightarrow {}_3Li^7 + {}_2He^4$$

The resulting lithium nucleus and the alpha particle produce dense ionization over a short range and detection of such ionization detects indirectly the passage of the neutron. This nuclear reaction is employed in detectors for slow neutrons which take the form of proportional counters filled with gaseous boron trifluoride (BF₃) or lined with a thin film of a solid boron compound. Commercial boron compounds are composed of a mixture of the isotopes $B^{10}$ and $B^{11}$ in an abundance ratio of about 1 to 4. The $B^{11}$ isotope component performs no useful function, and neutron detection efficiency increases as the proportion of the $B^{10}$ isotope increases. Proportional counters in which the boron compound consists substantially entirely of the isotope $B^{10}$ are preferred for the practice of the invention.

Linings of solid lithium compounds may be used instead of the boron linings.

Slow neutrons may also be detected employing a proportional counter having a lining of uranium and operating by fission, or with such a counter having a gas filling of a uranium compound.

Fast neutrons can be detected with an ionization chamber filled with hydrogen. The neutrons collide with the hydrogen atoms and thereby accelerate the hydrogen nuclei, i. e. protons— which are elementary particles of positive charge. These so-called recoil protons have ionizing properties and act in the normal way in the ionization chamber. Fast neutrons may also be detected by a proportional counter like that employed for slow neutrons except that it is shielded by a good neutron retarder in order to reduce neutron energies to the proper range. Thus a neutron-sensitive proportional counter surrounded by a layer of paraffin or other hydrogenous compound is suitable. Better still is a counter surrounded by paraffin which is in turn surrounded by a thin layer of cadmium. The cadmium removes the slow neutrons which try to reach the counter and the paraffin slows the remaining fast neutrons to such energies that the proportional counter is efficient for their detection.

Most of the elements in the periodic system become radioactive under neutron bombardment, and thereafter exhibit delayed radioactivity which is a function of (a) the kind of element (b) the intensity of the neutrons (c) the energy of the neutrons and (d) the time of exposure. For example, if neutrons are absorbed by silver, a delayed electron emission results. This phenomenon may be applied in the practice of the invention by exposing a silver plate to the action of natural neutrons emitted at a locality being investigated, say at a selected level in a bore hole, for a given length of time. Thereafter the plate is removed from the bore hole and its induced radioactivity is measured, say with a counter sensitive to beta radiation. By exposing a series of silver plates at different localities along a traverse being investigated and comparing the radioactivity induced in each, the relative neutron intensities at the several points may be determined.

With many elements, resonance capture of neutrons occurs, i. e. at certain definite neutron energies selective absorption takes place accompanied by the appearance of strong radioactivity. Thermal or "C" neutrons are strongly absorbed by cadmium. Next in energy are the so-called D neutrons that are strongly absorbed in rhodium. Neutrons in a slightly higher energy group are known as A neutrons and these are selectively absorbed in silver, and J neutrons of still higher energy are selectively absorbed in indium. The phenomenon of resonance capture may be employed in the practice of the invention to determine the energy of natural neutrons emitted at a series of points on an earth surface. For example, in bore hole investigations a plurality of plates are exposed together at a given level to the action of natural neutrons there emitted. Each plate is of a different element and each is selective to the capture of neutrons of a different energy. The exposed plates are withdrawn from the hole and separately subjected to investigation with a radiation detector, say a counter sensitive to beta rays. The intensity of the induced radioactivity in each case is a measure of the intensity of neutrons in a given energy range. Thus the natural neutron spectrum at the level in question is determined. By repeating the procedure at different levels, variations in spectra with depth may be determined.

The invention, as suggested above, is useful in a variety of types of geophysical exploration. In well logging, a neutron detector together with the necessary amplifiers, etc., is lowered into a bore by a cable containing a conductor through which the detector response is transmitted to the surface for indication or recording. The detector is pulled up the bore; neutral neutrons emitted at successive levels are detected, and by correlating depth of the detector with corresponding natural neutron density or intensity determinations a log is obtained. Various strata and formations penetrated by the bore give characteristic natural neutron intensities which serve to distinguish between them. Since, in general, neutrons have higher penetrating power than gamma rays, the natural neutron log is representative of a larger volume around the bore, inasmuch as a larger volume contributes to the measured intensity. The higher penetration however, does not exist when hydrogen is present in the formation adjacent the detector, hence the presence of water or oil bearing strata may appear in marked contrast to drier formations.

The natural neutron log obtained in the practice of the invention may be used alone, or as a supplement to other radiation or electrical logs, since in many instances natural neutron logging gives different information than the other types of logs.

For underground surveys along mine openings such as drifts or shafts, the procedure is substantially the same as in well logging, except that no long cable is required. The detector, amplifiers and recording or indicating equipment are carried from point to point along the mine opening. Readings may be taken continuously while moving along a traverse through known locations, or the instruments may be set up at each location or station to obtain a series of individual natural neutron intensity readings which subsequently are plotted as abscissa along a plot of the traverse as ordinate.

For surveys on the surface of the earth the procedures are similar to those conducted in underground mine openings. Continuous readings of natural neutron intensity preferably are taken along a traverse through known locations on the surface of the earth, for example, a line run across the suspected location of a buried beryllium deposit. Alternatively, readings may be taken with the instruments stationary at each of the several locations.

Having in mind the high penetrating power of neutrons, a so-called "natural neutron surface survey" made in accordance with the invention may be conducted at substantial distances above the earth, for example, with an airborne detector flown along the traverse in a helicopter. Readings may be taken with the instrument stationary with a hovering helicopter, or a continuous record may be obtained during flight.

Specific examples of the application of the invention to the discovery and location of buried mineral deposits are numerous.

Because sodium is one of the elements which enters into an $\alpha$-$n$ type of reaction, sodium chloride deposits such as salt domes may be discovered provided that the deposit contains radioactive contaminants to supply the alpha radiation necessary for the production of the natural neutrons. Thus a salt dome may be found by a natural neutron survey run across an area where such a dome is suspected to occur, the presence and location of the dome being manifested as a positive anomaly, i. e., an increase in natural neutron intensity in the neighborhood of the dome. Since oil and gas deposits often occur on the flanks of such domes, the method has importance in petroleum prospecting.

Beryllium and its compounds, under alpha bombardment, are efficient neutron emitters. A survey conducted in accordance with the invention will show buried beryllium mineral deposits by producing a positive anomaly provided that the natural radioactive contamination of the deposit is adequate and the deposit is not so deeply buried that there is excessive absorption of the natural neutrons emitted.

Aluminum enters into an $\alpha$-$n$ reaction, and bauxite naturally contaminated with small proportions of alpha emitters will give off neutrons that reveal the deposit through a positive anomaly.

As disclosed in my co-pending application Serial No. 13,842, filed March 9, 1948, now Patent 2,562,914, many ore deposits of metals which themselves are not radioactive, are surrounded by auras or zones in the country rock which emit gamma rays, probably due to the presence of minute proportions of radioactive materials. Since most natural gamma ray emitters also emit alpha and beta rays, an aura containing an element which will react with alpha or beta rays to produce neutrons may be discovered through a survey of natural neutron intensities thus indirectly revealing the presence of the deposit as a positive anomaly.

Negative anomalies discovered in the practice of the invention are also of interest. In some instances a valuable mineral deposit, for example, a zinc or lead ore body may have associated with it an aura in which the cadmium concentration is high enough to act as an efficient neutron absorber, so that, as the deposit is approached in a surface or underground survey, the intensity or energy or both of detected natural neutrons decreases to produce a significant negative anomaly. Another example of a significant negative anomaly may appear in the case of an oil pool which occurs in dolomite containing radioactive contaminants in proportions sufficient to produce highly energetic and hence strongly penetrating natural neutrons by $\alpha$-$n$ reaction with the magnesium of the dolomite. In this instance higher neutron intensities will be observed in areas not underlain by the pool, whereas the strong absorptive effect of the hydrocarbons will result in low neutron intensities or energies or both in areas underlain by the pool.

The invention has application in geologic mapping in situations where contacts between formations, such as the interface between tilted strata or a fault between dissimilar rocks is covered by detritus and hence hidden. If the rocks between which the contact lies are different with respect to kind or quantity of neutron emitters or kind or quantity of alpha or beta emitters for nuclear reaction with the neutron emitter, or in any other way which produces differences in natural neutron emission on opposite sides of the contact, an opportunity exists to determine and map the contact by a surface survey of natural neutron intensities. The high penetrating power of the neutrons permits them to pass through the overburden and thus disclose the presence of the contact, more or less sharply, depending upon the contrast in intensity or energies of neutrons emitted from opposite sides of the contact. Naturally enough, in this as in all other aspects of the method, the more efficient the neutron detection the sharper is the contrast.

It has been suggested above that the determination of the energy as well as the intensity of natural neutrons is significant in geophysical exploration because the neutron spectrum may be indicative (a) Of the nature of the source material, for example beryllium
(b) The amount or kind of the rock through which the neutrons penetrate to the point of detection Any convenient means for determination of neutron energy may be employed. Several are available. Thus it is possible to measure the number of neutrons in a given energy range employing boron-sensitizing proportional counters with various types of absorbing screens interposed in the path of the neutrons. Cadmium shields of ½ to 1 mm. thickness are opaque to low energy neutrons and practically transparent to neutrons of more than one volt energy. Borax and boron carbide shields of various thickness may also be used. The absorption of these shields varies inversely as neutron velocity, so the effect of a given thickness may be computed.

Well logging in that practice of the invention involving investigation of natural neutron spectra can be conducted by employing a plurality of detectors, say one sensitive to fast neutrons and another sensitive to slow neutrons. The two detectors are passed together along the well bore and the intensities of fast neutrons and the intensities of slow neutrons are detected and plotted separately against depth. As long as the two traces thus obtained have substantially the same shape from point to point there is no change in spectra, but a marked change in the shape of one trace as compared with the shape of the other for the same well depth indicates a change in spectra which may be indicative of a formation change or the like.

In another type of spectrum investigation the same detector is passed through the bore several times, each time with different shielding, and the several traces thus obtained are placed side by side for later comparison.

Similar procedures are employed in surveys across the surface of the ground and also in underground operations in various types of mine openings, the spectra being measured continuously along the traverse or with the detectors stationary at each location.

Although investigation of natural neutron intensity or spectra preferably is conducted in the field with rock in situ, it is possible to make natural neutron surveys by taking samples from stations along the traverse to be investigated, say along a mine drift, and measuring the natural neutron intensity of the individual samples to determine natural neutron intensity per unit mass of each sample. These values are then plotted as abscissae with the traverse as ordinate. Positive or negative anomalies thus determined may be indicative of concealed ore deposits in the vicinity.

The natural neutron spectrum of each sample may be investigated if desired, by separately detecting the intensities of the slow and the fast neutrons emitted by each.

I claim:

1. In geophysical exploration, the improvement which comprises determining the spectrum of natural neutrons emitted from an earth mass.

2. In geophysical exploration, the improvement which comprises taking a series of earth samples from known spaced locations in the earth, and detecting the relative intensity of fast and slow natural neutrons emitted by each of the samples.

3. In geophysical exploration, the improvement which comprises taking a series of earth samples from known spaced locations in the earth and separately detecting the intensities of fast and slow natural neutrons emitted by each sample.

4. In geophysical exploration, the improvement which comprises separately detecting the intensities of fast and slow natural neutrons emitted from the earth at a series of known locations on an earth surface.

5. In well logging, the improvement which comprises separately detecting the intensities of both fast and slow neutrons at each of a series of locations along a well bore.

6. In geophysical prospecting, the improvement which comprises distinguishing between geological formations by separately measuring the intensities of both fast and slow neutrons emitted by each.

7. In geophysical prospecting, the improvement which comprises locating natural deposits of elements which enter into an $\alpha$-$n$ reaction with alpha rays emitted by natural contaminants in the deposits by detecting the relative intensity of fast and slow natural neutrons resulting from the reaction and transmitted through the earth.

8. Process according to claim 7 in which the relative intensities of the fast and slow natural neutrons at a number of spaced locations remote from the deposit are determined.

9. Process according to claim 7 in which the relative intensities of the fast and slow neutrons resulting from the $\alpha$-$n$ reaction are separately detected at each of a number of spaced locations remote from the deposit.

10. In geophysical exploration, the improvement which comprises simultaneously but separately determining the intensities of fast natural neutrons and slow natural neutrons emitted from an earth mass.

11. In geophysical prospecting, the improvement which comprises determining the relative intensities by resonance capture of fast natural neutrons and slow natural neutrons emitted from the earth.

12. In geophysical prospecting, the improvement which comprises determining the relative intensities of fast natural neutrons and slow natural neutrons emitted from the earth by exposing to the neutrons at least two bodies, one of which selectively absorbs neutrons of one energy and the other of which selectively absorbs neutrons of a different energy, and thereafter determining the radiation emitted by the respective bodies.

13. In geophysical exploration for determining and locating different geological formations, the method which comprises the steps of determining the intensity of natural neutrons emitted from the earth at one location, determining the intensity of natural neutrons emitted from the earth at another location, and distinguishing between the geological formations at the different locations on the basis of the determined natural neutron intensities.

14. The method of claim 13 wherein each of the natural neutron intensities are determined in situ.

15. The method of claim 14 wherein each of the natural neutron intensities are determined from samples separated from the respective earth locations.

16. In distinguishing between different geological formations in the logging of a well, the method which comprises the steps of determining the intensity of natural neutrons emitted from the wall of the well bore at one location, determining the intensity of natural neutrons emitted from the wall of the well bore at another location, and distinguishing between the geological formations at the different locations on the basis of the determined natural neutron intensities.

GERHARD HERZOG.

REFERENCES CITED

The following references are of record in the file of this patent:

UNITED STATES PATENTS

| Number | Name | Date |
|---|---|---|
| 2,376,821 | Scherbatskoy et al. | May 22, 1945 |
| 2,390,433 | Fearon | Dec. 4, 1945 |
| 2,408,230 | Shoupp | Sept. 24, 1946 |
| 2,440,167 | Broxon et al. | Apr. 20, 1948 |

OTHER REFERENCES

Knoerr: Engineering and Mining Journal, July 1947, pp. 92–95.